United States Patent
Zhang et al.

(10) Patent No.: US 8,334,093 B2
(45) Date of Patent: *Dec. 18, 2012

(54) METHOD AND SYSTEM FOR PROVIDING A PERPENDICULAR MAGNETIC RECORDING HEAD

(75) Inventors: Jinqiu Zhang, Fremont, CA (US); Hai Sun, Milpitas, CA (US); Hongping Yuan, Fremont, CA (US); Tsung Yuan Chen, San Jose, CA (US); Guanxiong Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1007 days.

This patent is subject to a terminal disclaimer.

(21) Appl. No.: 12/262,572

(22) Filed: Oct. 31, 2008

(65) Prior Publication Data

US 2010/0112486 A1     May 6, 2010

(51) Int. Cl.
*H04R 31/00*     (2006.01)
(52) U.S. Cl. .................. 430/314; 430/319; 360/125.1; 29/603.12
(58) Field of Classification Search .............. 430/314, 430/319; 360/125.1; 29/603.12
See application file for complete search history.

(56) References Cited

U.S. PATENT DOCUMENTS

| | | |
|---|---|---|
| 6,751,846 B2 | 6/2004 | Hashimoto et al. |
| 6,862,798 B2 | 3/2005 | Kruger et al. |
| 6,949,833 B2 | 9/2005 | O'Kane et al. |
| 6,996,894 B2 | 2/2006 | Hsiao et al. |
| 7,067,066 B2 | 6/2006 | Sasaki et al. |
| 7,108,796 B2 | 9/2006 | Bergevin et al. |
| 7,139,153 B2 | 11/2006 | Hsiao et al. |
| 7,263,762 B2 | 9/2007 | Bedell et al. |
| 7,287,314 B2 | 10/2007 | Guthrie et al. |
| 2006/0198049 A1 | 9/2006 | Sasaki et al. |
| 2006/0225268 A1 | 10/2006 | Le et al. |
| 2007/0146931 A1 | 6/2007 | Baer et al. |
| 2007/0177301 A1 | 8/2007 | Han et al. |
| 2007/0186408 A1 | 8/2007 | Nix et al. |
| 2007/0217069 A1 | 9/2007 | Okada et al. |
| 2007/0242389 A1 | 10/2007 | Balamane et al. |
| 2007/0245545 A1 | 10/2007 | Pentek et al. |

*Primary Examiner* — Daborah Chacko Davis (57) ABSTRACT

A method and system for providing a PMR pole in a magnetic recording transducer including an intermediate layer are disclosed. The method and system include providing a mask on the intermediate layer. The mask includes a line having at least one side. A hard mask layer is provided on the mask. At least a portion of the hard mask layer resides on the side(s) of the line. At least part of the hard mask layer on the side(s) of the line is removed. Thus, at least a portion of the line is exposed. The line is then removed, providing an aperture in the hard mask corresponding to the line. The method also includes forming a trench in the intermediate layer under the aperture. The trench top is wider than its bottom. The method further includes providing a PMR pole, at least a portion of which resides in the trench.

16 Claims, 11 Drawing Sheets

METHOD AND SYSTEM FOR PROVIDING A PERPENDICULAR MAGNETIC RECORDING HEAD

BACKGROUND

Figure 1:
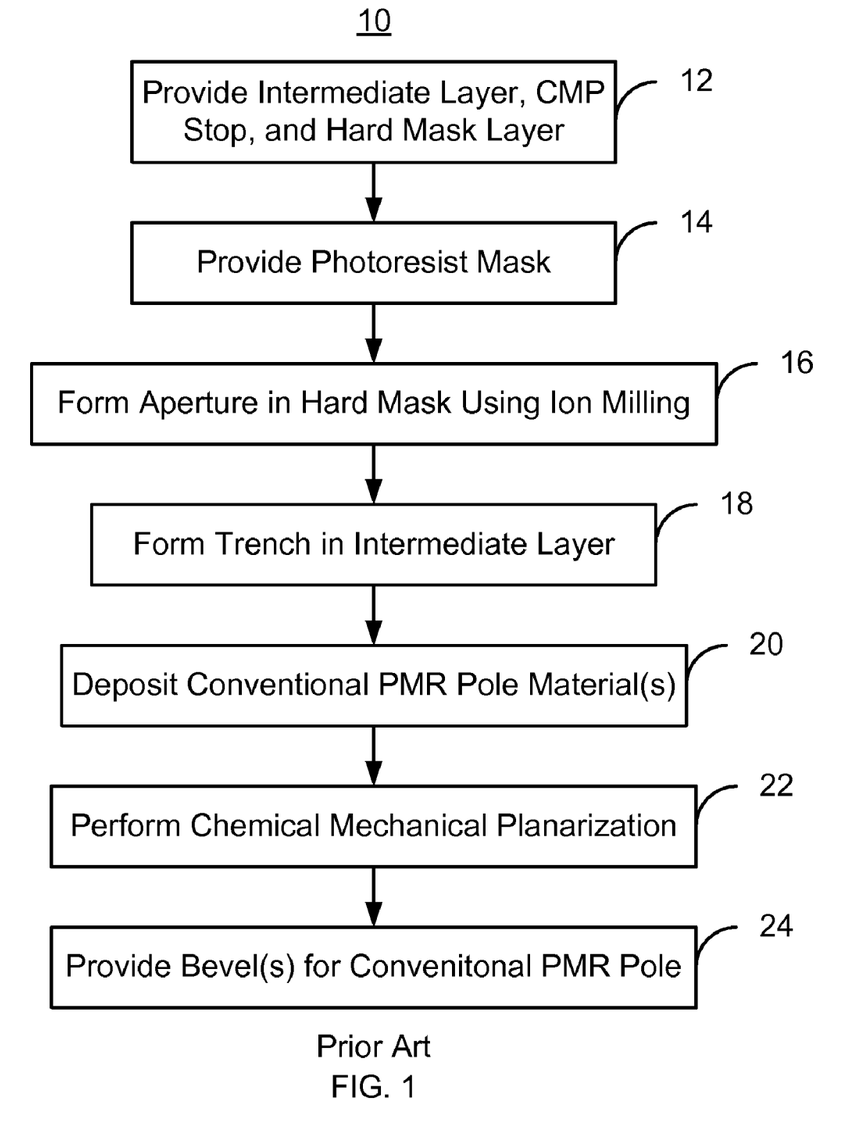
FIG. 1 is a flow chart depicting a conventional method for fabricating a PMR head.

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 14. The photoresist mask includes an aperture above the portion of the intermediate layer in which the PMR pole is to be formed. A conventional aperture is formed in the hard mask layer, via step 16. Typically, this is accomplished through using a conventional ion mill. Step 16 also includes forming a conventional aperture in the CMP stop layer. Thus, through ion milling in step 16, the pattern of the photoresist mask is transferred to both the hard mask and the CMP stop layer in a conventional manner.

Using the hard mask and photoresist mask, a trench is formed in the aluminum oxide layer, via step 18. Step 18 is typically performed using an alumina reactive ion etch (RIE). The top of the trench is desired to be wider than the trench bottom. In addition, the trench may extend through the aluminum oxide intermediate layer. As a result, the PMR pole formed therein will have its top surface wider than its bottom. Consequently, the sidewalls of the PMR pole have a reverse angle. The conventional PMR pole materials are deposited, via step 20. Step 20 may include plating or sputtering ferromagnetic pole materials as well as seed layer(s). A CMP is then performed, via step 22. The stop layer provided in step 12 is used to terminate the CMP.

Bevel(s) may also be provided in the conventional PMR pole, via step 24. If a top bevel is to be provided, step 24 may include removing a top portion of the ferromagnetic pole materials in the region of the air-bearing surface (ABS). As a result, the top surface of the conventional PMR pole near the ABS is lower than the yoke portion of the PMR pole. If step 24 is to be used to form a bottom bevel, the step 24 is typically performed earlier in the method 10, for example prior to step 20. In such a case, step 24 may include masking a portion of the trench formed in step 18 and refilling the bottom of the trench near the ABS region. As a result, a bottom bevel may be formed. Thus, the conventional PMR pole is provided. Subsequent structures, such as a write gap and shields, may then be provided.

Although the conventional method 10 may provide the conventional PMR transducer, there may be drawbacks. Use of the photoresist mask and hard mask may result in relatively large variations in the critical dimension of the conventional PMR pole. The critical dimension corresponds to the track width of the conventional PMR pole. Such variations in track width may adversely affect fabrication and performance. In addition, the conventional PMR pole may be relatively large in size. Using conventional photolithography, the critical diameter of the apertures formed in step 16, and thus the trench provided in step 18, is typically greater than one hundred fifty nm. Consequently, without more, the conventional PMR poles formed using the conventional method 10 may not be usable in high density magnetic recording technology.

Accordingly, what is needed is an improved method for fabricating a PMR transducer.

SUMMARY

A method and system for providing a PMR pole in a magnetic recording transducer are disclosed. The method and system include providing a mask on the intermediate layer. The mask includes a line having at least one side. The method and system further include providing a hard mask layer on the mask. At least a portion of the hard mask resides on the side(s) of the line. The method and system further include removing at least part of the portion of the hard mask layer residing on the side(s) of the line. As a result, at least a portion of the line is exposed. The line is then removed. Thus, an aperture in the hard mask corresponding to the line is provided. The method and system also include forming a trench in the intermediate layer under the aperture. The trench has a bottom and a top wider than the bottom. The method and system further include providing a PMR pole, at least a portion of which resides in the trench. In one aspect, the trench has a first width in the ABS region and a second width in the yoke region of the PMR pole. The first width is less than the second width. In this aspect, a nonmagnetic layer may be deposited such that an ABS portion of the nonmagnetic layer on the bottom of the trench in the ABS region is thicker than a yoke portion of the nonmagnetic layer on the bottom of the trench in the yoke region. As a result, a bottom bevel may be formed.

DETAILED DESCRIPTION OF THE PREFERRED EMBODIMENTS

Figure 2:
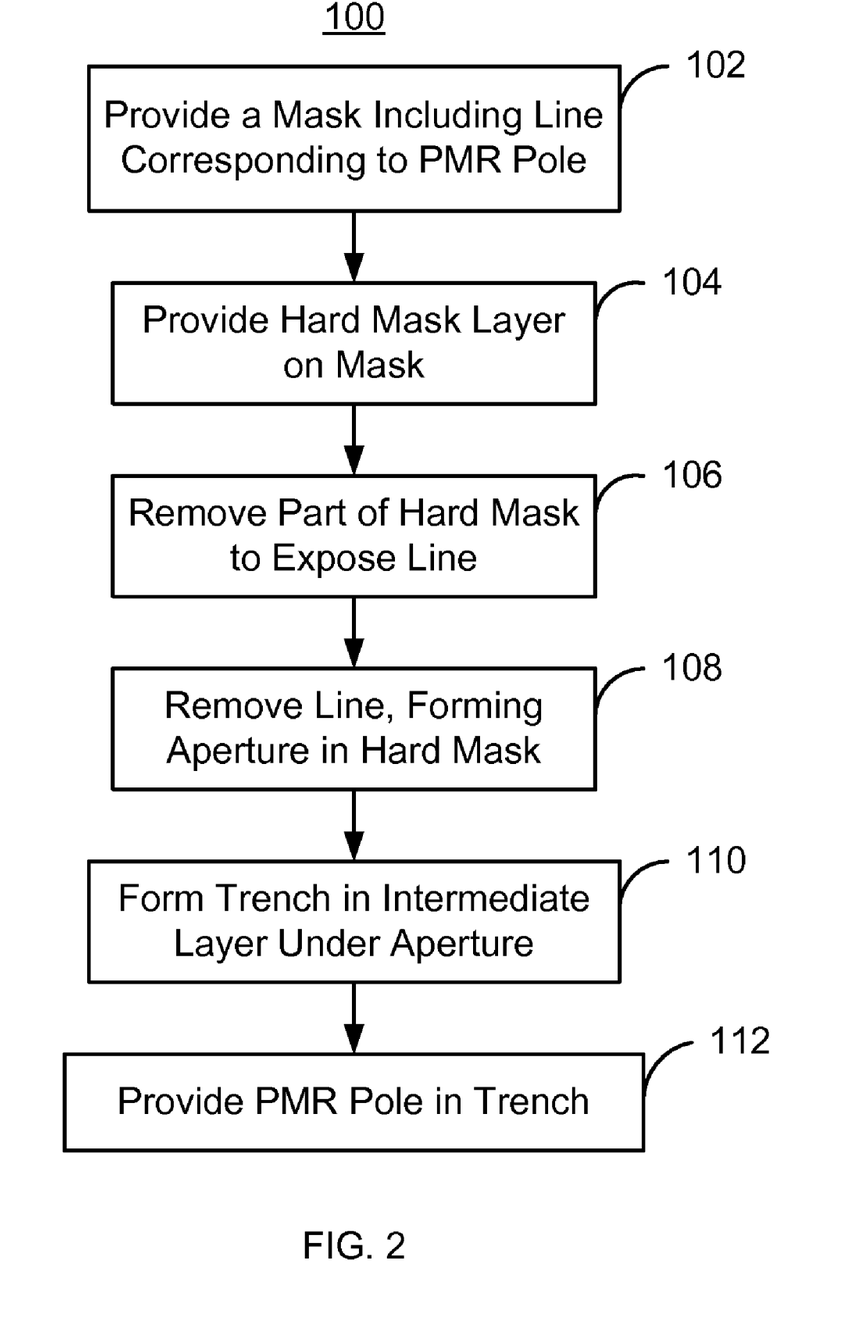
FIG. 2 is a flow chart depicting an exemplary embodiment of a method for fabricating a PMR transducer.

FIG. 2 is a flow chart depicting an exemplary embodiment of a method 100 for fabricating a PMR pole for a PMR transducer. For simplicity, some steps may be omitted. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole in a single magnetic recording transducer. However, the method 100 may be used to fabricate multiple transducers at substantially the same time. The method 100 and system are also described in the context of particular layers, such as a BARC layer. However, in some embodiments, such layers may include multiple sub-layers.

In one embodiment, the method 100 commences after formation of the intermediate layer(s) in which the PMR pole is to reside. In one embodiment, the intermediate layer is an insulator such as alumina. The intermediate layer may reside on an underlayer. Further, in one embodiment, the underlayer layer may be an etch stop layer. A mask is provided on the intermediate layer, via step 102. The mask includes a line that corresponds to the location of the PMR pole. In one embodiment, the mask is a photoresist mask and may be formed using photolithographic techniques. For example, a BARC might be used in order to improve formation of the line. The BARC reduces reflections in forming a photoresist mask on the BARC layer. In such an embodiment, formation of the mask may further include removal of any BARC exposed by the mask. A hard mask layer is provided on the mask, via step 104. For example, step 104 may include deposition of a material such as NiCr, NiFe, Cr, and/or Ru.

A portion of the hard mask layer is removed to expose the line, via step 106. In one embodiment, the hard mask layer is removed through a high angle ion mill. For example, in one embodiment, an ion mill is carried out at an angle of at least seventy degrees and not more than ninety degrees from normal to the surface of the transducer. In one such embodiment, this angle is at least seventy-seven and not more than eighty three degrees. As a result, a portion of the hard mask layer on at least the sides of the line is removed. At least part of the side(s) of the line are, therefore, exposed.

The line in the mask is removed, via step 108. In one embodiment, step 106 includes performing a lift-off of the line. The lift-off is possible because at least part of the line is exposed in step 106 and thus made accessible to the etchant used. The hard mask including an aperture corresponding to the line is thus formed. The aperture in the hard mask resides in substantially the position occupied by the line.

A trench is formed in the intermediate layer under the aperture, via step 110. The trench has a bottom and a top wider than the bottom. Consequently, the trench formed is appropriate for a PMR pole. In one embodiment, the trench extends through the intermediate layer. However, in another embodiment, the trench might extend only partially through the intermediate layer. In one embodiment, step 110 includes performing a RIE.

A PMR pole is provided, via step 112. At least a portion of the PMR pole resides in the trench. In one embodiment, only part of the PMR pole resides within the trench in the intermediate layer. Thus, the top of the PMR pole would be above the top of intermediate layer. In an alternate embodiment, the entire PMR pole resides within the trench. Formation of the PMR pole in step 112 may include providing one or more nonmagnetic layers in the trench. Such nonmagnetic layer(s) might be used to adjust the critical dimension, and thus the track width, of the PMR pole. In addition, seed layer(s) may also be provided. Thus, the PMR pole would reside on such a nonmagnetic layer(s). In one embodiment, the nonmagnetic layer(s) used for track width adjustment may be provided using atomic layer deposition (ALD). As part of step 112 a planarization stop layer might also be provided. In one embodiment, the planarization stop layer is provided on the nonmagnetic layer(s). The planarization stop layer may be a CMP stop layer. In one such embodiment, the planarization stop layer includes Ru. In another embodiment, the planarization stop layer may also function as a seed layer. The layer(s) for the PMR pole may also be blanket deposited. A planarization, such as a CMP, may be performed. In addition, the geometry of the PMR pole might be further adjusted using an ion beam etch. Top and/or bottom bevels may also be formed for the PMR pole. The bottom bevel might be formed by continuing filling of the trench using the nonmagnetic layer(s) such that a portion of the PMR pole in proximity to the ABS is higher than a portion of the PMR pole in a yoke region. A top bevel might be formed by removing a portion of the PMR pole material after the CMP is performed. Thus, the PMR pole may be formed. Although described above as part of formation of the PMR pole, at least some of the steps of providing the nonmagnetic layer, the planarization stop layer and/or the seed layer may be considered separate from providing the PMR pole.

Using the method 100, at least part of a PMR transducer may be formed. The method 100 utilizes the photoresist line to provide the aperture in the hard mask. In one embodiment, the line in the mask may have a critical dimension, or width, that is not larger than two hundred nanometers. The critical dimension of the line might also be not more than one hundred nanometers. As a result, the critical dimension for the PMR pole may be not more than two hundred nanometers in one embodiment. In another embodiment, the critical dimension might be not more than on hundred nanometers. The PMR transducer formed may thus be used at higher densities. For example, the PMR transducer formed might be usable in 400 Gb/in$^2$ or higher density transducers. Further, use of bottom and/or top bevels may further concentrate the magnetic flux in the desired manner. In addition, because a lift-off the line may be performed in step 108, fabrication of the PMR transducer may be simplified. Using the method 100, therefore, a PMR transducer usable at higher densities may be fabricated.

Figure 3:
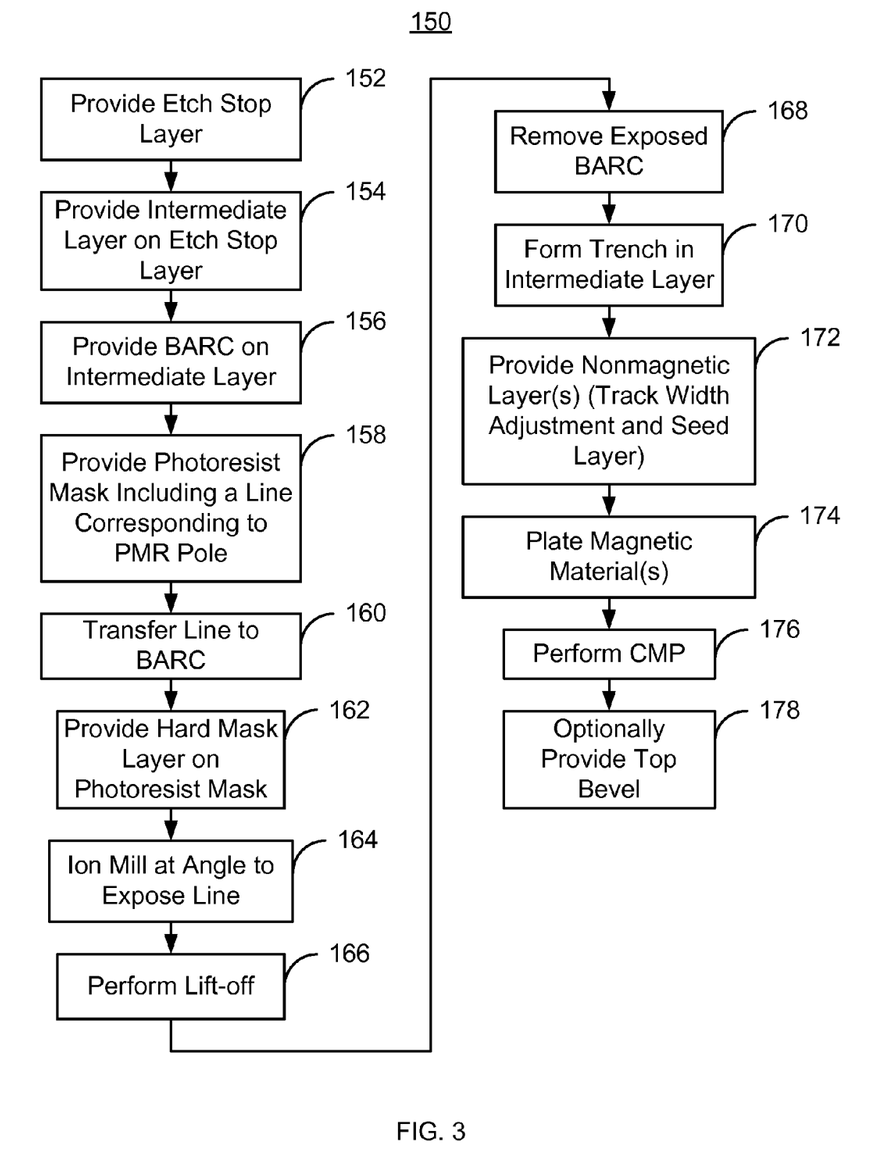
FIG. 3 is a flow chart depicting another embodiment of a method for fabricating a PMR transducer.

FIG. 3 is a flow chart depicting another exemplary embodiment of a method 150 for fabricating a PMR transducer. For simplicity, some steps may be omitted. FIGS. 4-13 are diagrams depicting an exemplary embodiment of a PMR transducer 200 as viewed from the ABS during fabrication. For clarity, FIGS. 4-13 are not to scale. Referring to FIGS. 3-13, the method 150 is described in the context of the PMR transducer 200. However, the method 150 may be used to form another device (not shown). The PMR transducer 200 being fabricated may be part of a merged head that also includes a read head (not shown) and resides on a slider (not shown) in a disk drive. The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers, such as a bottom antireflective coating (BARC) layer. However, in some embodiments, such layers may include multiple sublayers.

Figure 4:
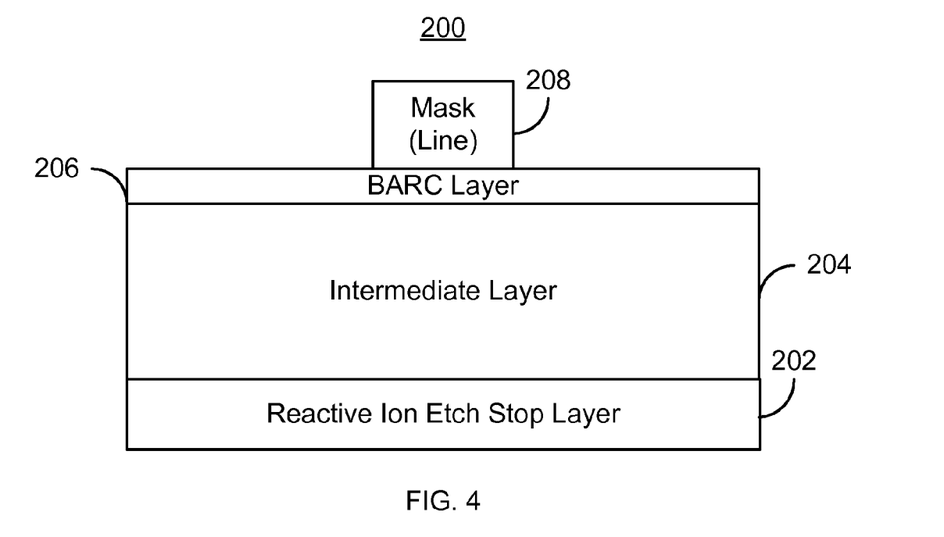
FIGS. 4-13 are diagrams depicting an exemplary embodiment of a perpendicular magnetic recording transducer during fabrication.

An etch stop layer, or underlayer, is provided, via step 152. The layer may be used as a stop for an aluminum oxide RIE. An intermediate layer is provided on the etch stop layer, via step 154. The intermediate layer is nonmagnetic and may be a dielectric layer, such as an aluminum oxide layer. A BARC is provided on the intermediate layer, via step 156. A photoresist mask is provided on the BARC, via step 158. The photoresist mask includes a line that corresponds to the location of the PMR pole. FIG. 4 depicts a portion of the PMR transducer 200 after step 158 is performed. In the embodiment shown, an underlayer 202 that may also functions as an etch stop layer 202, is shown. In addition, an intermediate layer 204 is also depicted. Also shown are a BARC 206 and a mask 208. In the embodiment shown, the mask 208 consists of a line. However, in another embodiment, the mask 208 may include other features. In addition, the mask 208 used may include a line for each PMR pole being formed.

Figure 5:
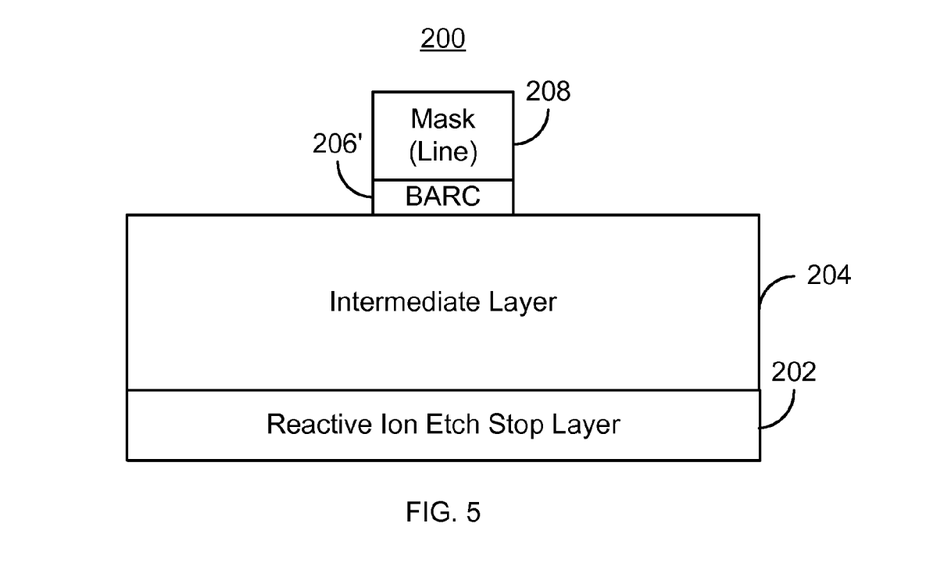

The pattern of the mask 208 is transferred to the BARC 206, via step 160. FIG. 5 depicts the PMR transducer 200 after step 160 is performed. Thus, the BARC 206' resides only under the line 208. The remaining portion of the BARC layer 206 has been removed. A hard mask layer is provided on the PMR transducer 200, via step 162. Step 162 may include deposition of a material such as NiCr, Cr, NiFe and/or Ru.

Figure 6:
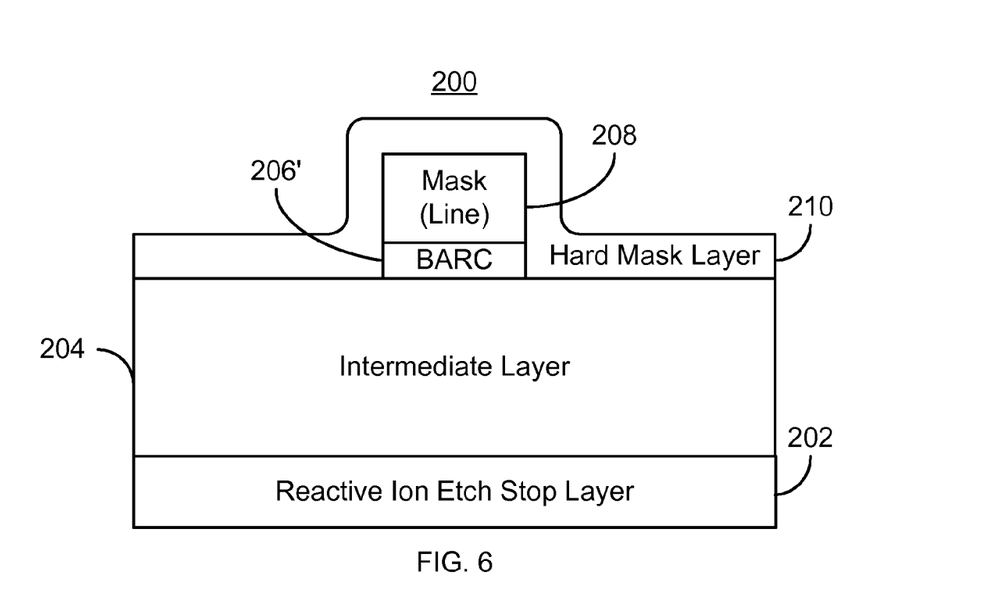

FIG. 6 depicts the PMR transducer 200 after step 162 is performed. Thus, a hard mask layer 210 has been provided.

Figure 7:
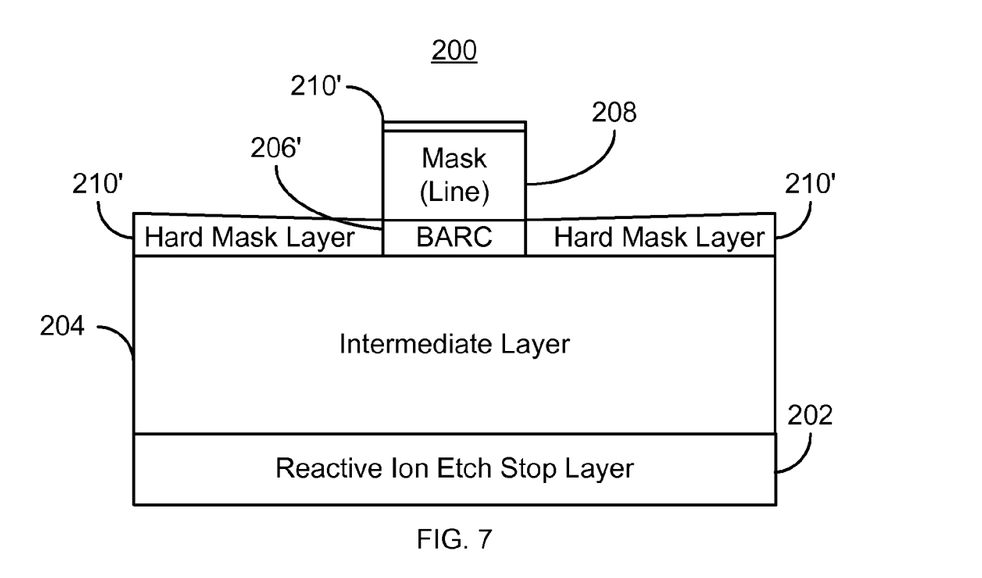

An ion mill is performed at an angle to expose the line of the mask 208, via step 164. In one embodiment, the milling is performed at a higher angle to normal to the surface of the PMR transducer 200. For example, in one embodiment, the angle may be at least seventy and not more than ninety degrees. In another embodiment, the angle is at least seventy seven and not more than eighty-three degrees. In one embodiment, endpoint detection is used to control the amount of the hard mask layer 210 removed from the sides of the line 208. FIG. 7 depicts the PMR transducer after step 164 has been performed. Thus, a hard mask layer 210' has been formed from the hard mask layer 210. A portion 210' of the hard mask layer may remain on the top of the mask 208. However, the sides of the line of the mask 208 are at least partially exposed.

Figure 8:
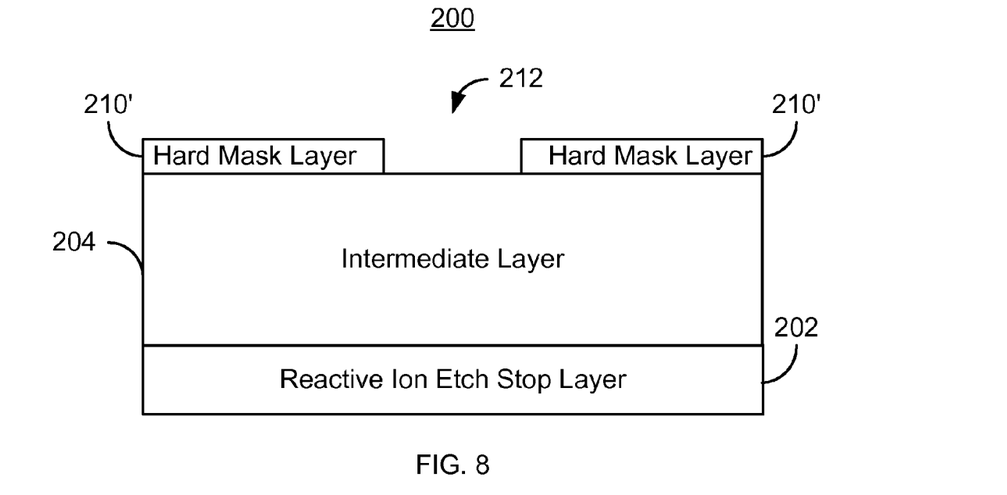

A lift-off is performed, via step 166. As a result, the remaining portion 208 of the line is removed. In addition, the remaining portion 206' of the BARC that was under the line is removed, via step 168. FIG. 8 depicts the PMR transducer 200 after step 168 is completed. Thus, an aperture 212 in the hard mask 210' has been formed. The aperture 212 exposes the underlying intermediate layer 204. The aperture 212 corresponds to the line of the mask 208. As a result, the location and size of the aperture 212 match that of the line.

Figure 9:
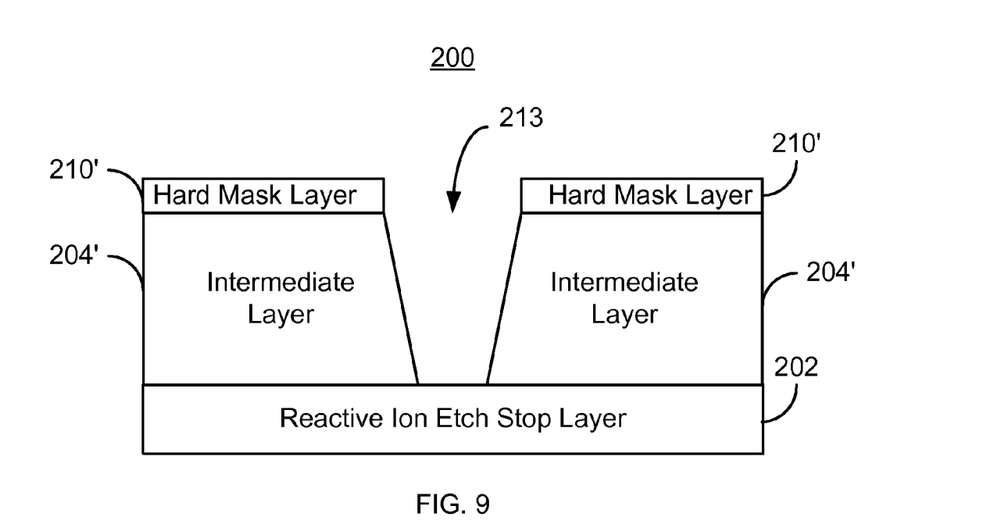

A RIE is performed to form a trench in the intermediate layer 204, via step 170. In one embodiment, the RIE is performed utilizing a Cl-containing gas. FIG. 9 depicts the PMR transducer after step 170 is performed. Thus, a trench 213 has been formed in the intermediate layer 204'. For clarity, the aperture 212 is no longer labeled. Instead, the trench 213 formed under the aperture is labeled. The trench 213 has a bottom and a top wider than the bottom.

The PMR pole is then formed. This may occupy a number of steps, for example steps 172 through 178. In one embodiment, at least one nonmagnetic layer is provided in the trench 213, via step 172. At least a portion of the nonmagnetic layer resides in the trench 213. In one embodiment, step 172 may include providing a track width adjustment layer, as well as a seed layer. Formation of the track width adjustment layer may, for example, be performed by depositing aluminum oxide using ALD. However, in another embodiment, another method and/or material for the track width adjustment layer may be used. Because it is magnetically separate from the pole being formed, the track width adjustment layer may be used to reduce the critical diameter of the pole being formed. Stated differently, the nonmagnetic layer may be considered to make the trench 213 less wide and, in one embodiment, shallower. Thus, the thickness of the nonmagnetic layer may be used to tune the width and height of the PMR pole being formed. In particular, the width the PMR pole may be reduced by twice the thickness of the nonmagnetic layer. In addition, the trench formed in step 168 may be configured to be thinner in a region near the final location of the ABS than at the yoke region. In such an embodiment, the trench 213 may be partially filled by the nonmagnetic layer(s) in the ABS region. In such a case, a bottom bevel may be formed. In addition, a seed layer may be deposited on the track width adjustment layer. In some embodiments, the seed layer may also be a CMP stop layer. Alternatively, the hard mask layer 210' may be used as a stop layer. In another embodiment, the seed layer might be magnetic. Alternatively, step 172 might be omitted.

Figure 10:
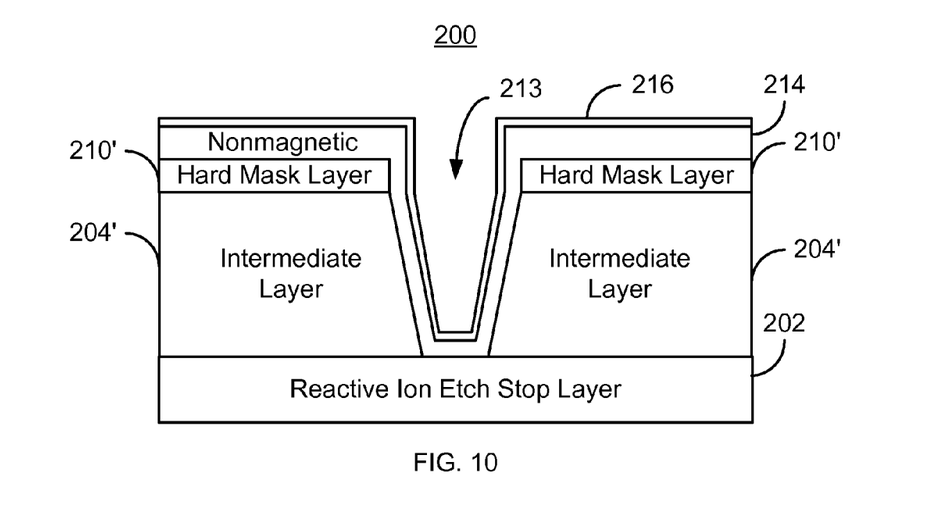

FIG. 10 depicts the PMR transducer 200 after step 172 is performed. Thus, a nonmagnetic layer 214 and a seed layer 216 are all shown. A portion of each of the nonmagnetic, track width adjustment layer 214 and the seed layer 216 resides in the trench 213. However, another portion of each of the nonmagnetic layer 214 and the seed layer 216 may also reside on and next to the hard mask 210'. Thus, a portion of the nonmagnetic layer 214 is above the top of the intermediate layer 204'.

Figure 11:
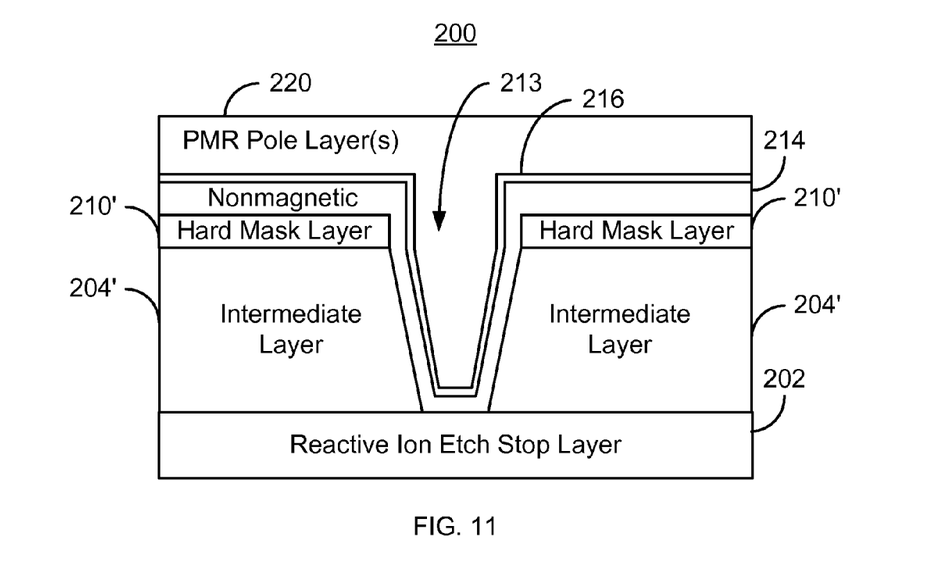

PMR pole layer(s) may be provided, via step 174. Step 174 may include plating the PMR pole layer(s). In one embodiment, a single layer is used. However, in another embodiment, multiple layers might be used for the PMR pole. Consequently, multiple layers might be deposited in step 174. In the embodiment described, the PMR pole layer(s) are blanket deposited. However, in another embodiment, masking might be used. In one embodiment, the PMR pole layer is plated on the planarization stop layer 216. In an embodiment in which a separate seed layer is used, the PMR pole layer may also be plated on the seed layer 218 and, if used, the nonmagnetic layer 214. FIG. 11 depicts the PMR transducer 200 after step 174 is performed. Thus, the PMR pole layer 220 resides in the trench 213. However, another portion of the PMR pole layer 220 may also reside on and next to the hard mask 210'. Thus, a portion of the PMR pole layer 220 is above the top of the intermediate layer 204'.

Figure 12:
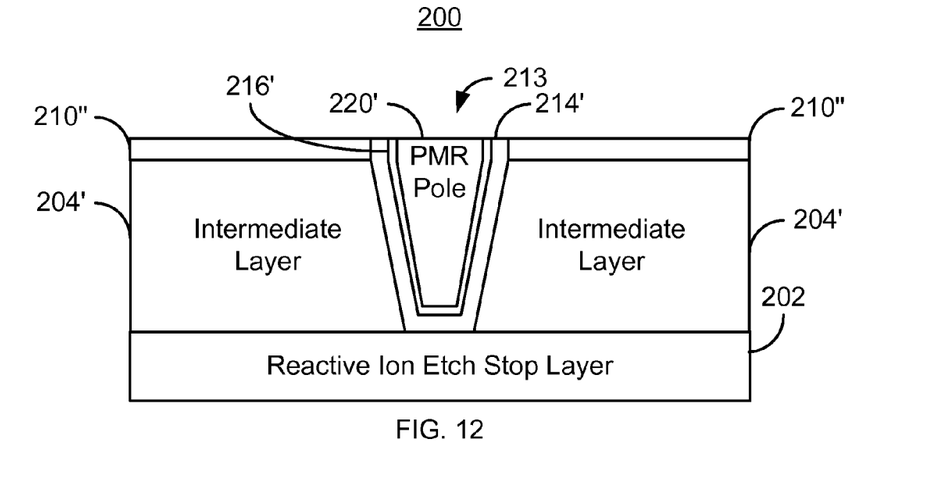

A CMP, or other planarization selected, is performed, via step 176. The CMP planarization may terminate when at least a portion of the planarization hard mask 210' remains. FIG. 12 depicts the PMR transducer 200 after step 176 has been performed. Consequently, the PMR pole 220' has been formed from the PMR pole layer(s) 220. In addition, a portion of the seed layer 216 and track width adjustment layer 214 have been removed. Consequently, only portions of the seed layer 216' and track width adjustment layer 214' remain after step 176 is performed. In addition, only a portion 210" of the hard mask remains. In the embodiment shown, only a portion of the PMR pole 220' resides within the trench 213. This portion of the PMR pole 220' has a top wider than the bottom. Stated differently, there is a negative angle (as measured from vertical) for these portions of the sidewalls of the PMR pole 220'. A remaining portion of the PMR pole 220' is next to the hard mask layer 210', nonmagnetic layer 220, and remaining planarization stop layer 222'. The sidewalls for this portion of the PMR pole 220' are substantially vertical.

In addition, a top bevel may optionally be provided in step 178. In one embodiment, step 178 would include masking a portion of the PMR pole 220' distal from the ABS location and removing a top portion of the PMR pole proximate to the ABS location. Thus, in the region of the ABS, the height of the PMR pole 220' would be lower. Consequently, using the method 150, a bottom bevel, a top bevel, or both may be formed.

Figure 13:
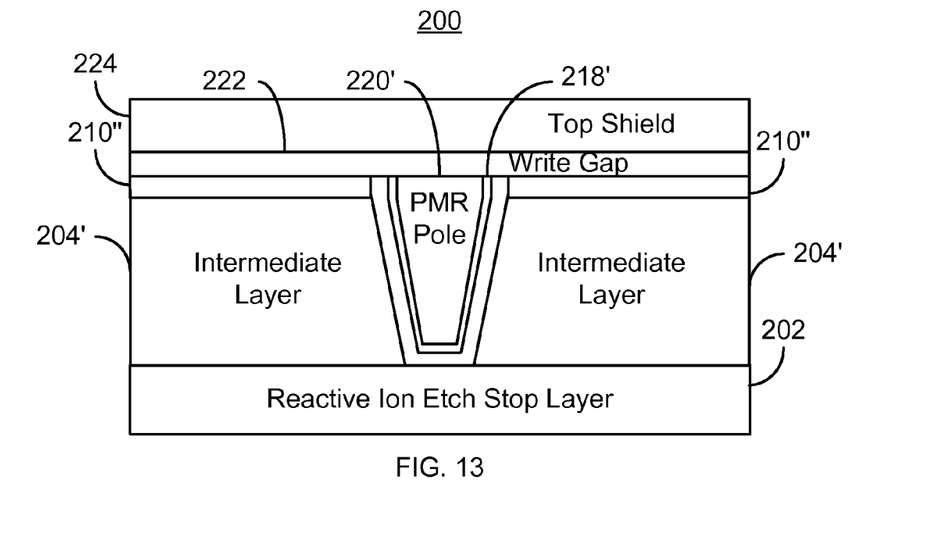

Fabrication of the PMR transducer 200 might then be completed. For example, a write gap, a shield, and other structures might be provided. FIG. 13 depicts the PMR transducer 200 after such structure are provided. Thus, the write gap 222 and top shield 224 are shown. In one embodiment, the write gap 228 may be an insulator, such as aluminum oxide. In another embodiment, other material(s) may be used.

Using the method 150, at least part of the PMR transducer 200 may be formed. The method 150 utilizes the photoresist line of the mask 208 to provide the aperture 212 in the hard mask 210'. The line is exposed using an ion mill that may be better controlled through the use of endpoint detection. As a result, lift-off may be used to remove the line. Because a lift-off may be performed, the hard mask 210' may have sharper edges at the aperture 212. Consequently, the edges of the PMR pole 220' may be better defined. In one embodiment, the line in the mask 208' may have a critical dimension, or width, that is not larger than two hundred nanometers. The critical dimension of the line 208 might also be not more than one hundred nanometers. As a result, the critical dimension for the PMR pole 220' may be not more than two hundred nanometers in one embodiment. In another embodiment, the critical dimension might be not more than one hundred nanometers. The PMR transducer 200 may thus be used at higher densities. For example, the PMR transducer 200 might be usable in 400 Gb/in$^2$ or higher density transducers. Using the method 150, therefore, a PMR transducer 200 usable at higher densities may be fabricated.

Figure 14:
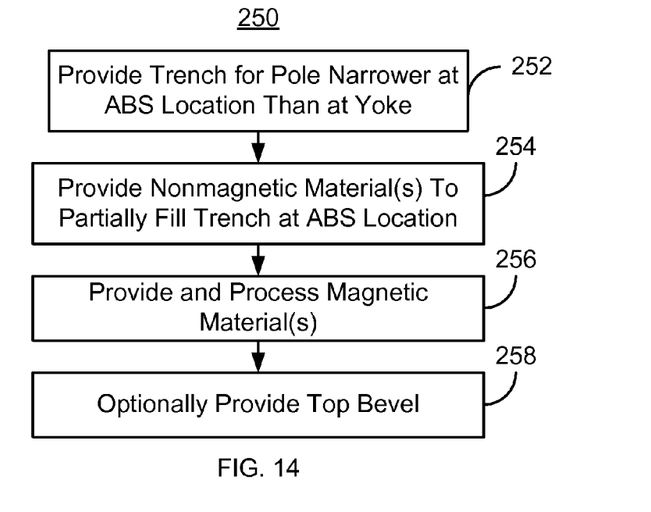
FIG. 14 is a flow chart depicting an exemplary embodiment of a method for fabricating a pole.

As described above, top and/or bottom bevels may be provided for the PMR pole 220'. FIG. 14 is a flow chart depicting an exemplary embodiment of a method 250 for fabricating a pole including bevel(s). FIGS. 15-22 are diagrams depicting an exemplary embodiment of a perpendicular magnetic recording transducer 280 during fabrication. The transducer 280 may be part of a magnetic recording head that may also include a read transducer (not shown) and resides on the slider for a disk drive. The magnetic recording transducer 280 corresponds to the magnetic recording transducer 200. The method 250 is described in the context of the magnetic recording transducer 280. Referring to FIGS. 14-22, in the method 250, some steps may be omitted or combined. In addition, for clarity, FIGS. 15-22 are not drawn to scale. The method 250 is also described in the context of providing a single recording transducer. However, the method 250 may be used to fabricate multiple transducers at substantially the same time. The method 250 and transducer 280 are also described in the context of particular layers. A particular layer may include multiple materials and/or multiple sublayers. The method 250 may be incorporated into the methods 100 and 150 to provide a beveled pole. For example, the method 250 may be incorporated into steps 112 and/or 170-178.

Figure 15:
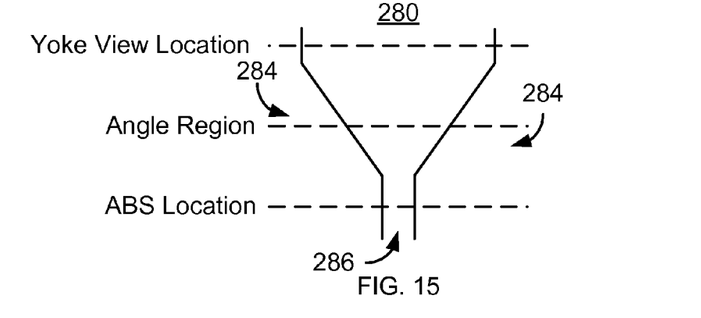
FIGS. 15-22 are diagrams depicting an exemplary embodiment of a perpendicular magnetic recording transducer during fabrication.
Figure 16:
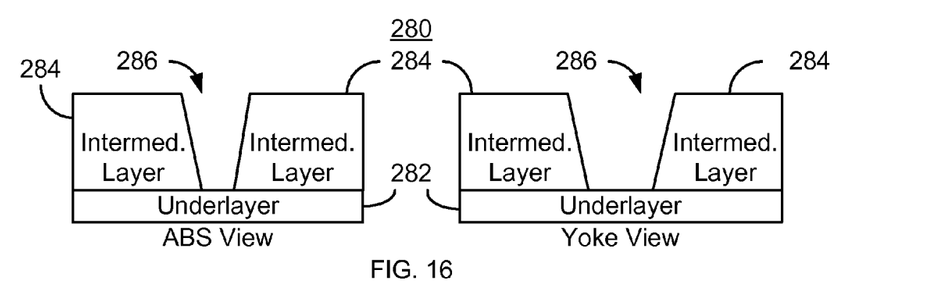

A trench is formed in an intermediate layer, via step 252. The trench formed in step 252 is narrower in proximity to the ABS location, the location at which the ABS is to reside. Using step 252, trench formed in steps 110 and/or 170 of the method 100 and/or 150 may have a profile that is narrower near the pole tip in proximity to the ABS location, and wider near a yoke portion of the pole. Step 252 may be performed by forming a portion of the hard mask near the ABS location using a photoresist line, as described in the methods 100 and 150. However, other portion(s) of the hard mask may have a different profile and be formed in another manner. FIG. 15 depicts a plan view of the transducer 280 after step 252 is completed. FIG. 16 depicts ABS location and yoke region views of the magnetic transducer 280 after step 252 is performed. Thus, underlayer 282 and intermediate layer 284 are shown. The underlayer 282 may be an etch stop layer. The trench 286 resides between portions of the intermediate layer 284. As can be seen in FIGS. 15-16, the trench 286 may be considered to include three regions, an ABS region in proximity to the ABS location, an angle region, and a yoke region. The ABS location is marked by a line in FIG. 15 and shown in FIG. 16. The yoke view location is also marked in FIG. 15 and shown in FIG. 16. The angle region is also indicated in FIG. 15. As can be seen in FIGS. 15-16, the trench 286 is narrower in the track width direction in proximity to the ABS location than distal from the ABS location, at the yoke region.

As described above with respect to the methods 100 and 150, during formation of the pole, additional nonmagnetic material(s) may be provided. These material(s) may include additional insulating layers and/or seed layers. Consequently, such nonmagnetic material(s) are provided at a thickness sufficient to fill a bottom portion of the trench 286 in proximity to the ABS, via step 254. In step 254, therefore, deposition of the nonmagnetic material(s) of steps 112 and/or 172 is continued in until the material on the sides of the trench 286 grows together to fill a bottom portion of the trench 286 in proximity to the ABS location. However, the bottom of the trench 286 in the yoke region is not completely filled. In other words, the nonmagnetic material(s) at the bottom of the trench 286 are thicker proximate to the ABS location than distal from the ABS location.

Figure 17:
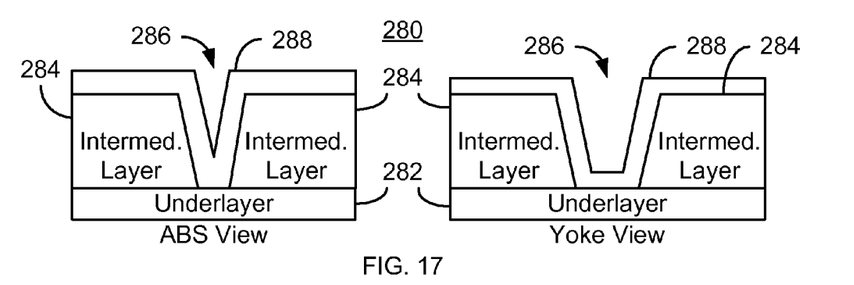
Figure 18:
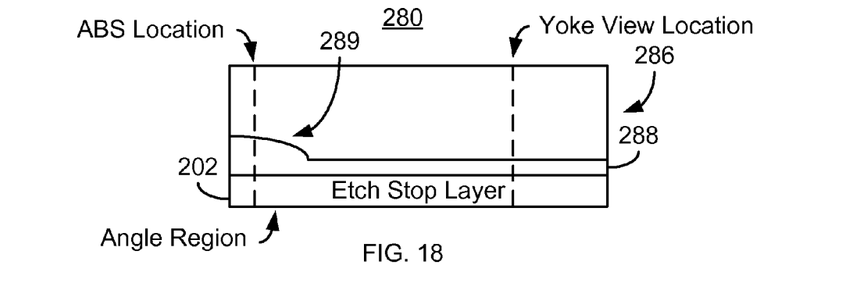

FIGS. 17-18 depict the magnetic transducer 280 after step 254 is completed and magnetic material(s) for the pole have been deposited. FIG. 17 depicts ABS and yoke views of the magnetic transducer 280. FIG. 18 depicts a side view of the magnetic transducer 280. Thus, nonmagnetic material(s) 288 have been provided. Although only a single layer is shown, the nonmagnetic material(s) 288 may include multiple layers. Thus, the bottom of the trench 286 is filled in the ABS region, but not filled in the yoke region. Consequently, the nonmagnetic material(s) 288 are thicker in the ABS region, thin through the angle region, and are thinnest in the yoke region. As a result, the depth of the trench 286 is lowest in the ABS region, increases through the angle region, and is deepest in the yoke region. For the magnetic recording transducer 280, profile of the trench 286 changes diameter smoothly. However, in another embodiment, the diameter of the trench may increase in another manner.

Figure 19:
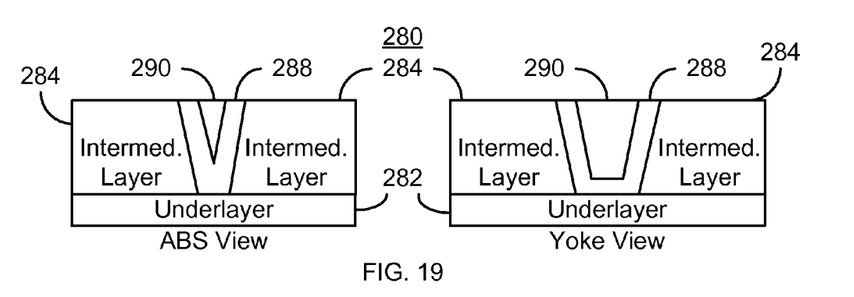
Figure 20:
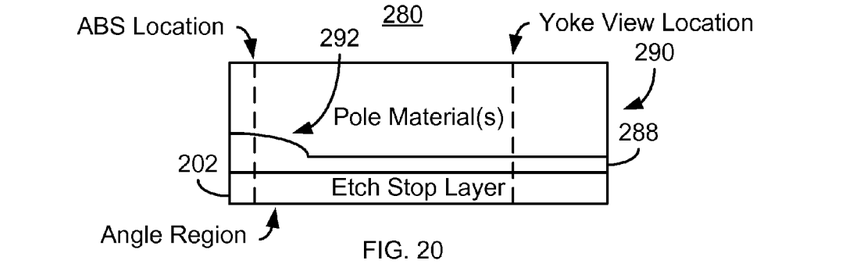

The pole material(s) are provided and any desired planarization performed in step 256. FIGS. 19-20 depict the magnetic transducer 280 after step 256 is performed. FIG. 19 depicts ABS and yoke views of the magnetic transducer 280. FIG. 20 depicts a side view of the magnetic transducer 280. Thus, pole material(s) 290 have been provided. Because of the change in diameter of the trench 286, the thickness of the nonmagnetic material(s) 288 at the bottom of the trench 286 changes. As a result, the depth of the magnetic materials 290 change from the ABS location to the yoke region. A bottom bevel 292 may thus be formed.

Figure 21:
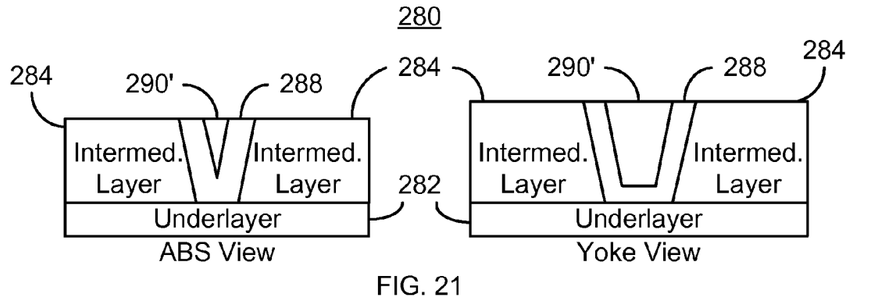
Figure 22:
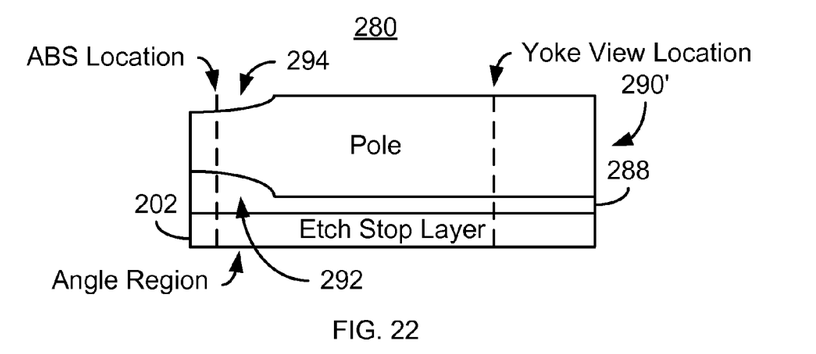

A top bevel may optionally be provided, via step 258. In one embodiment, step 258 includes masking a portion of the transducer 280 distal from the ABS location, and removing a top portion of the pole material(s) 290. FIGS. 21-22 depict the magnetic transducer 280 after step 258 is performed. FIG. 21 depicts ABS and yoke views of the magnetic transducer 280. FIG. 22 depicts a side view of the magnetic transducer 280. Because a portion of the pole material(s) has been removed, the pole 290' remains. In addition to the bevel 292, a top bevel 294 has also been formed.

Thus, in addition to the benefits achievable using the methods 100 and 150, bevel(s) 292 and/or 294 may also be provided using the method 250. Bevel(s) 292 and 294 may improve the flux concentration. Consequently, high-density performance of the magnetic transducer may be improved.

We claim:

1. A method for providing a PMR pole in a magnetic recording transducer including an intermediate layer, the method comprising:

providing a mask on the intermediate layer, the mask including a line having at least one side;

providing a hard mask layer on the mask, a portion of the hard mask layer residing on the at least one side;

removing at least part of the portion of the hard mask layer residing on the at least one side, at least a portion of the line being exposed;

removing the line, thereby providing an aperture in the hard mask layer corresponding to the line;

forming a trench in the intermediate layer under the aperture, the trench having a bottom and a top wider than the bottom; and providing a PMR pole, at least a portion of the PMR pole residing in the trench.

2. The method of claim 1 wherein the line includes a photoresist line.

3. The method of claim 2 wherein the step of removing the line further includes:
performing a lift off of the line.

4. The method of claim 1 wherein the step of removing the at least the part of the portion of the hard mask layer further includes
ion milling the magnetic recording transducer at an angle from normal to a surface of the magnetic recording transducer.

5. The method of claim 4 wherein the angle is at least seventy degrees and not more than ninety degrees.

6. The method of claim 5 wherein the angle is at least seventy-seven and not more than eighty three degrees.

7. The method of claim 1 wherein the step of forming the trench further includes:
performing at least one reactive ion etch (RIE) to remove a portion of the intermediate layer.

8. The method of claim 7 further comprising:
providing an RIE etch stop layer under the intermediate layer, a portion of the RIE etch stop layer forming the bottom of the trench.

9. The method of claim 1 further comprising:
providing a nonmagnetic layer, at least a portion of the nonmagnetic layer residing in the trench, the PMR pole residing on the nonmagnetic layer.

10. The method of claim 9 wherein the step of providing the nonmagnetic layer further includes:
providing an aluminum oxide layer using atomic layer deposition; and
providing a seed layer on the aluminum oxide layer.

11. The method of claim 9 wherein the magnetic recording transducer includes an air-bearing surface (ABS) region and a yoke region and wherein the step of providing the trench further includes:
providing the trench having a first width in the ABS region and a second width in the yoke region, the first width being less than the second width.

12. The method of claim 11 wherein the step of providing the nonmagnetic layer further includes:
continuing deposition of the nonmagnetic layer such that an ABS portion of the nonmagnetic layer on the bottom of the trench in the ABS region is thicker than a yoke portion of the nonmagnetic layer on the bottom of the trench in the yoke region.

13. The method of claim 1 further comprising:
providing a bottom antireflective coating (BARC) under the mask; and
transferring the line to the BARC before the step of providing the hard mask layer, a remaining portion of the BARC residing under the line.

14. The method of claim 13 further comprising:
removing the remaining portion of the BARC under the line after the line has been removed.

15. The method of claim 1 wherein the top of the PMR pole has a width not more than two hundred nanometers.

16. The method of claim 15 wherein the width is not more than one hundred nanometers.

* * * * *